United States Patent [19]

Sanglier et al.

[11] Patent Number: 4,794,636
[45] Date of Patent: Dec. 27, 1988

[54] METHOD AND APPARATUS FOR CODE MATCHING THE BASE AND MOBILE UNIT OF A CORDLESS TELEPHONE SET

[75] Inventors: Jean-François Sanglier, Flers; Stephane Negre, Nice, both of France

[73] Assignee: U.S. Philips Corp., New York, N.Y.

[21] Appl. No.: 756,144

[22] Filed: Jul. 17, 1985

[30] Foreign Application Priority Data

Jul. 27, 1984 [FR] France ............ 84 11963

[51] Int. Cl.⁴ ............................................. H01Q 7/01
[52] U.S. Cl. ................................................. 379/62
[58] Field of Search ............... 179/2 EA; 379/61, 62

[56] References Cited

U.S. PATENT DOCUMENTS

| | | | |
|---|---|---|---|
| 4,332,981 | 6/1982 | Palombi et al. | 179/2 EA |
| 4,535,200 | 9/1985 | Himmebauer et al. | 179/2 EA |
| 4,560,832 | 12/1985 | Bond et al. | 179/2 EA |
| 4,574,163 | 3/1986 | Zato | 179/2 EA |
| 4,593,155 | 6/1986 | Hawkins | 179/2 EA |
| 4,639,549 | 1/1987 | Hirayama et al. | 379/62 |

*Primary Examiner*—Robert Lev
*Attorney, Agent, or Firm*—Thomas A. Briody; Leroy Eason

[57] ABSTRACT

A method and apparatus for code matching the base and mobile unit of a cordless telephone set. A new matching code is established by a microprocessor in the base unit each time the mobile unit is replaced thereon, and is stored in respective memories therein. Replacement of the mobile unit on the base unit is detected from the charging current which is then drawn by a rechargeable battery in the mobile unit from a power source connected to the base unit.

6 Claims, 2 Drawing Sheets

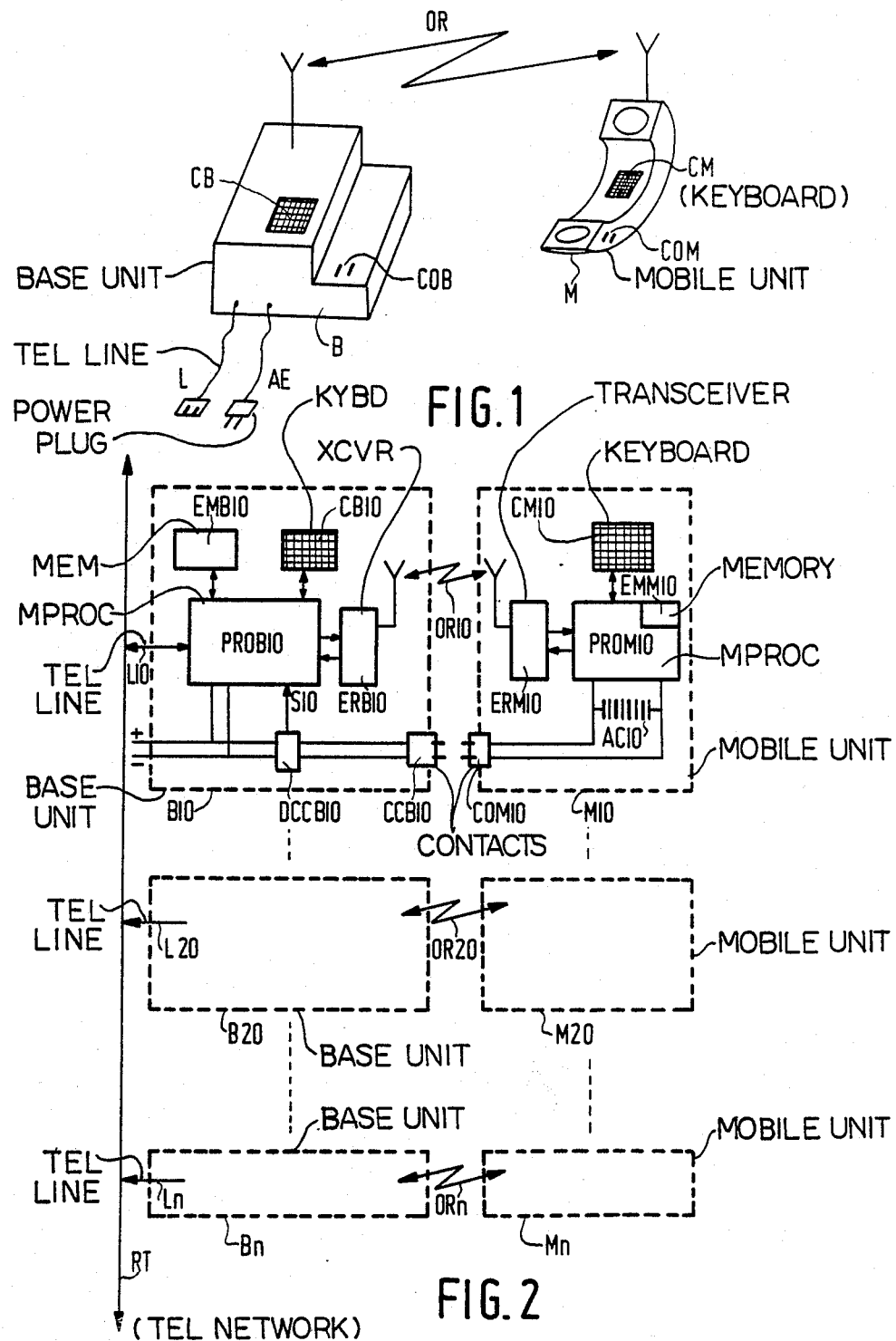

METHOD AND APPARATUS FOR CODE MATCHING THE BASE AND MOBILE UNIT OF A CORDLESS TELEPHONE SET

BACKGROUND OF THE INVENTION

1. Field of the Invention

The present invention relates to a method of establishing a mutual matching code between the base unit of a cordless telephone set and a mobile unit.

The invention also relates to an arrangement for putting this method into effect.

The base unit is connected to the telephone network, and the mobile unit is a cordless handset which communicates with the base unit by wireless link.

2. Description of the Related Art

Apparatus of this type are described in published French patent specification No. 8301036; corresponding to U.S. Pat. No. 4,535,200, issued Aug. 13, 1985. Such apparatus is designed to make it possible for a user to have telephone conversations while moving with his mobile unit around the base unit within geographical limits which are bounded by the quality necessary for a good rdio link; taking account of the large number of potential users, it is known to establish a mutual matching code between a base unit and its associated mobile unit to prevent interferences between the users. The prior art methods of establishing a mutual matching code result in a static and/or manual matching initiated by the user, which is not without its disadvantages.

SUMMARY OF THE INVENTION

The invention provides a method of establishing a mutual matching code between a base unit and a cordless mobile unit, the base and mobile units together constituting a cordless telephone, said base unit and said mobile unit being one of a plurality of sets of geographically distributed base and mobile units, each base unit and each mobile unit including a memory location for storing an identification code, a base unit and a mobile unit being linked over a communicated channel when their respective identification codes are identical. It is possible for a mobile unit to be physically placed on or lifted off its base unit, each base unit and each mobile unit comprising an arrangement for transmitting and receiving radio signals for, when the base unit and the mobile unit have a mutually matching code and the mobile unit is not physically on the base unit, establishing, maintaining and breaking off a sequence of telephone communications. The standard state of a base unit and a mobile unit is a stand-by state, which is switched by the base unit to an operating state when an incoming call reaches the base unit originating from the telephone network or by a call request coming from the mobile unit. The method is characterized in that each time the mobile unit is replaced on the base unit the identification codes of the base unit and the mobile unit are modified by a procedure which comprises at least the following steps:

(a) switching the standard stand-by state to the operating state, (b) replacing the existing identification code(s) already present in the base unit and the mobile unit by a new, common code which is stored in the base and mobile units and which are thus matched, (c) return to the standard stand-by state.

Thus, matching a specific base unit and a specific mobile unit is no longer effected manually at user's option, but automatically each time a mobile unit is replaced on the base unit. In addition, code matching is effected rather frequently and dynamically because of the fact that it is periodically necessary for the mobile unit to be placed on the base unit in order to recharge the battery which is generally contained in the mobile station for energizing its radio transceiver.

For reasons of price and weight, the battery in the mobile unit is only self-sufficient without recharging for a limited time interval.

Because of this fact, a fraudulent user whose mobile unit code might accidentally match the code of the base unit will not keep the correct code for very long because the base unit code will change again when the authorized mobile unit is replaced on the base unit.

A further advantage is the fact that, in the event of malfunctioning, it is possible to change either the base unit or the mobile unit without any worry about the matching code; even when the base unit and the mobile unit are installed for the first time there is no need to establish a matching code in advance.

According to a preferred mode of putting the method into effect, it comprises in addition the following step (b) after stage (a):

(b) comparing the previous identification code of the mobile unit with the previous identification code of the base unit, and in the case of code equality, pass immediately to the following step (c), if there is not code equality waiting a comparatively long period of time before passing to the following step (c).

Thus, when the base and mobile units already have matching codes, which is the case of code equality, modifying the code requires only a very short time without any noticeable discomfort for the authorized user; if in contrast therewith there is not code equality, a comparatively long waiting time is imposed before the base and mobile units become operative, which constitutes a safety measure for preventing a fraudulent mobile unit from discovering the code by a trial and error method.

The process of the invention is preferably accomplished by storing the identification code of the mobile unit in a volatile memory of the random-access memory tape (RAM), particularly the internal RAM of the microprocessor of the mobile unit, as this memory is already available in such microprocessor.

A high degree of security and versatility are thereby obtained. On the one hand the mobile units produced in the factory can be "neutral", that is to say without a matching code; on the other hand the RAM becomes neutral again as soon as the battery in the mobile units is exhausted, so that comparatively frequent placement of the mobile unit on the base unit is necessary in normal usage.

BRIEF DESCRIPTION OF THE DRAWINGS

The present invention has additional advantages which will become more apparent from the description of the non-limitative embodiments described with reference to the accompanying figures:

FIG. 1 is a plan view of a base unit and a mobile unit;

FIG. 2 shows the internal circuit diagram of a base and a mobile unit.

DESCRIPTION OF THE PREFERRED EMBODIMENTS

Figure 3:
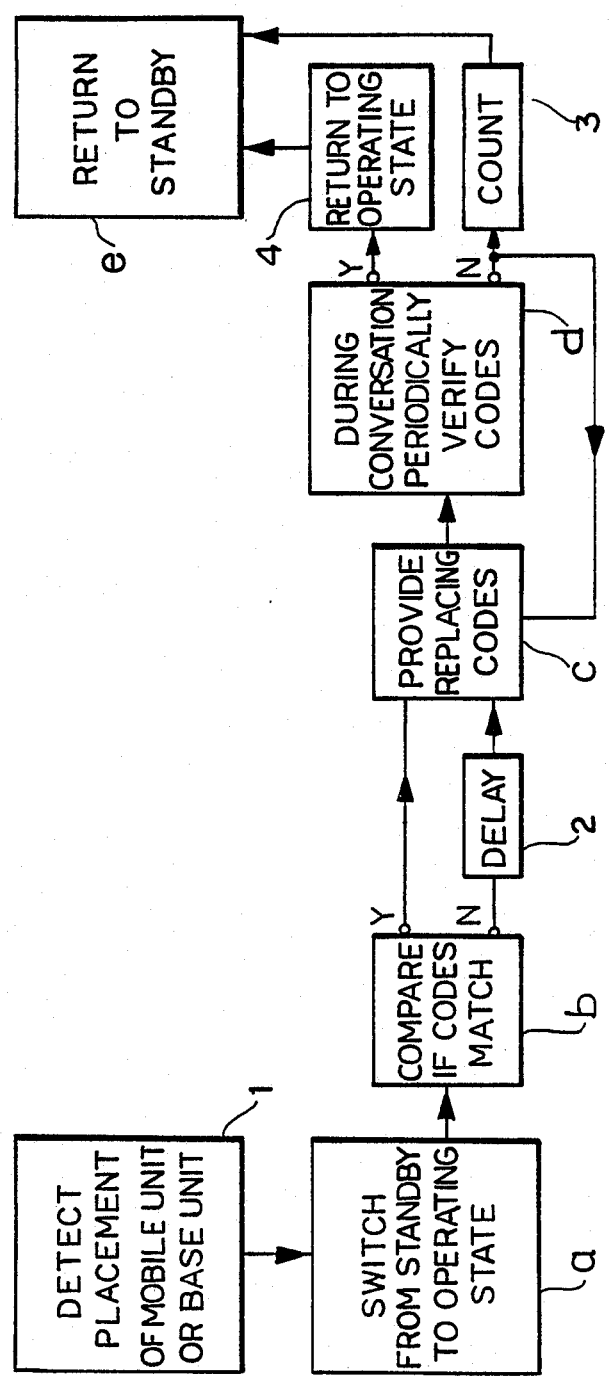
FIG. 3 is a flow chart of the operation carried on by the base unit and the mobile unit in FIG. 2.

The base and mobile units according to the invention will first be described, so that thereafter the advantages of the method according to the invention will become more apparent.

FIG. 1 shows a base unit B and a mobile unit M which together form a telephone station.

The base unit B is connected to the telephone network by a line L and an electric power supply AE.

The mobile unit M resembles a customary telephone handset but there is no cord and it communicates with the base unit by radio waves OAR, particularly when the mobile unit is not on the base unit as shown in FIG. 1.

The mobile unit comprises a keyboard CM for, for example, accessing a line and/or composing the number of another subscriber. The base unit comprises a keyboard CB for, for example, putting the telephone station into operation, by means of the on/off switch.

The base unit has a space, shown in the off-hook situation in FIG. 1, for supporting the mobile unit there. In FIG. 1 the mobile unit M is not on the base unit B; when the mobile unit M is placed on the base unit in the intended location, the contacts COM of the mobile unit are in connection with the contacts COB of the base unit. This connection, of not more than two contacts, is more specifically used for recharging the battery in the mobile unit since it is discharged in proportion to the number of transmissions and receptions.

FIG. 2 shows schematically a telephone network RT to which there are connected more specifically a population of base units B10, B20, . . . Bn which are connected to the telephone network RT by respective telephone lines L10, L20, . . . Ln; the references of FIG. 2 are the same as those in FIG. 1 but provided with indices; each base is matched with, respectively, a mobile unit M10, M20, . . . Mn with which it communicates by radio waves OR10, OR20, . . . ORn; the radio waves are transmitted and received by respective transceivers of the base unit ERB10 and of the mobile unit ERM10; the drawing shows one base unit and one mobile unit is sufficient details necessary for an understanding of the invention.

The other base unit-mobile unit stations being identical, all the radio waves utilize the same channel, which causes risks of interferences between geographically near subscriber telephone stations. The base B10 comprises an electric energy source (+, −) for supplying the checking microprocessor PROB10, in this case a 7507 CMOS monochip with a capacity for 2 k bytes of program memory, manufactured by NEC; all this information is given by way of example only. The power supply is also connected to the contacts COB10 of the base unit B10 which are arranged such that, when the mobile unit is located on the base unit, they connect with the contacts COM10 of the mobile unit and thus recharge the battery AC10. The detector DCCB10 of the base unit sends a signal S10 to the microprocessor POB10 when it detects the presence of a charging current, which is indicative of the fact that the mobile unit is resting on the base unit. A different detection arrangement, for example a mechanical detector, may be used to detect placement of the mobile unit, on the base unit but the arrangement according to the invention has the advantageous feature of being simple.

The microprocessor of the base unit is also connected to a control keyboard CB10 which may more specifically comprise (not shown) an on/off switch, a push button for calling the mobile unit when the user does not know where he has put it, and further a manual control for entering a personal identification code for establishing a mutual matching identification code in accordance with the invention. In the memory EMB10 connected to the microprocessor there is a location for storing the existing identification code, or the identification code in the process of being established, of the base unit, this memory preferably being of the electrically erasable PROM type. The microprocessor PROB10 may also be connected to further elements which are not shown but are well known to those skilled in the art and are not necessary for an understanding of the invention.

In the mobile unit, the battery AC10 supplies a microprocessor PROM10, which may also be the above-mentioned 7507 CMOS monochip; here the CMOS technology is substantially imperative in order to minimize current consumption in the mobile unit.

The microprocessor PROM10 is connected to the transceiver ERM10 and to a keyboard CM10. It is also connected to other members, not shown, known to those skilled in the art. The keyboard CM10 includes more specifically a line interrupter and dialling keys.

The microprocessor PROM10 comprises an internal random-access memory EMM10, which is advantageously used for storing in a memory location therein the existing identification code, or the code being in the process of being established, of the mobile unit.

In the standard standby state the base unit and the mobile unit are inoperative; when an external call reaches the base unit coming from the telephone network, the standby state is interrupted and the base unit transmits a control message for "switching" the mobile unit to the operating state, which signifies the call to the user by known means such as the customary bell, light signal, etc.

The user can then reply by activating the line interrupter in keyboard CM10 of the mobile unit which causes a control message to be sent to the base unit. The base unit can then set up the actual communication channel which continues while the call is in progress, in the form of a wireless transmission of audio signals between the mobile unit and the base unit. The call ends when the user again activates the line interrupter, which causes a new control message to be transmitted to the base unit which cause it to cut off the communication channel.

It is known from the prior art that by means of identification codes in the base unit and the mobile unit a check can be made to verify whether the said control messages are transmitted by authorized users. In contrast therewith, the invention is characterized in that this verification is also effected during the communication to prevent another mobile unit from "seizing" the communication channel and substituting itself, for example because of a stronger transmitting power, for the initial mobile unit. The latter might then find that it is "off-hook" and does not have the power to cut off the communication channel at the base unit and the base unit will then continue the conversation with the other mobile unit. The verification during the conversation can, for example, be effected periodically every 30 seconds at the initiative of the base unit, which transmits a code identification request message to the mobile unit, wherever it may be, with which the audio communication is supposed to be continued; if a reply message is received fom the mobile unit which comprises the correct identification code, the communication is continued; if not, the communication channel is cut by the base unit. If no reply is forthcoming the code request may optionally be repeated by the base station a number of times before the communication is cut. The interruption of the audio conversation in progress effected during the verification period must not interfere with the conversation. This duration must consequently be comparatively short, advantageously 150 milliseconds, so as to be substantially imperceptible to the user. When the communication channel is interrupted as a result of this verification check, a return is made to the standard, or resting, state.

This mode of verification during the communication is particularly characterized in that it is free of charge, in the sense that it is not an additional call to transmit an instruction which will be charged to the verifying base station.

The method of establishing a mutual matching code for a base unit and a mobile unit may be provided by a series of steps which will now be described with reference to FIG. 3 in its most advantageous embodiment.

Following detection in step 1 that the mobile unit has been replaced on its base unit, the method comprises the following steps:

(a) switching the standard stand-by state of both units to the operating state;

(b) comparing the existing identification code stored in the mobile unit with the existing identification code stored in the base unit and:

passing immediately to step (c) when there is equality, delaying in block 2 a comparatively long time, advantageously one hour, before passing to the step (c) when there is no equality;

(c) replacing the existing identification code(s) of the base unit and the mobile unit by a new common code which is stored in the base unit and in the mobile unit, and which are thus mutually matched; the new common code is advantageously generated by the microprocessor in the base unit by using a random algorithm to ensure that each mutual matching code is unique;

(d) during a conversation, periodically verifying that the codes stored in the base unit and in the mobile unit located on the base unit are identical, and:

when there is no equality, returning to step (c) and opening the communication channel after a predetermined number of such unsuccessfull trials;

if there is equality, reconnecting the communication channel during the telephone conversation and thereafter pass to the following step (c)

(e) return to the standard stand-by state.

The steps (b) and (d) are improvements of the basic invention which resides predominantly in the steps (a), (c) and (e).

During step (b), if there is no mutual matching code the telephone station is not operative during the comparatively long waiting period. To avoid this inconvenience, it is possible to provide a provisional mutual matching code in the base unit and the mobile unit to render the station operational without further delay, which constitutes a variation of step (b).

The method of establishing a mutual matching code in accordance with the invention is also applicable to telephone stations comprising a plurality of mobile units associated with one single base unit comprising a multichannel transmitting arrangement. Advantageously, each mobile unit is assigned to one single channel and matching of each mobile unit to the base unit is established independently of the other mobile units. Thus the base unit has as many individual memory locations for storing identification codes as there are mobile units assigned to it. Each mobile unit further comprises a device which distinguishes it from other mobile units when it is in the on-hook condition; this device may be a simple mechanical projection therein.

The method of establishing a mutual matching code in accordance with the invention and its variations is particularly characterized in that all the procedures are performed in the master-slave mode, the base unit being the master and the mobile unit the slave. This means that all the decisions are taken only by the base unit; for example, when the user acts on the line interrupter of the keyboard of the mobile unit in order to make a call, the mobile unit remains in the standard stand-by state until it receives a control message from the base unit indicating that the requested access to the line has indeed been effected. That will not occur until the mobile unit has transmitted a validating control message by dialling of the correct identification code number by the keyboard.

The master-slave mode mentioned above is preferred since it ensures the coherence of the successive states of the base unit and the mobile unit, respectively.

When for technical reasons, the procedure for establishing a mutual matching code is of a comparatively long duration, even in the case of equality as in step (b) or (b'), this may be inconvenient for the user because he cannot use his mobile unit during the duration; it is then advantageous to perform this procedure in advance by means of a simulated mode and to validate the simulation thereafter.

The simulated mode requires an additional memory location for storing the new identification code which awaits validation, but it has the advantage that it can be interrupted, which means that the telephone station remains operational for the duration of the simulation procedure. The station is not rendered inoperative until the end of the simulation procedure and then only for the duration of the validation; this duration is very short as it requires a simple transfer in the memory of the indentification code from its simulation location to its normal location.

With the object of improving the reliability of the transmissions, more specifically of the control messages, between the base unit and the mobile unit, additional electric contacts may be provided on the base unit and on the mobile unit for providing the communication channel between these two units via these contacts rather than via radio, when the mobile unit is located on the base unit. Thus, the risks inherent to radio transmissions are avoided.

What is claimed is:

1. A method of establishing mutually matching identification codes in the base unit and mobile unit of a cordless telephone set wherein the base unit is connected to an external telephone network and the mobile unit is physically replaceable on and off the base unit, the base unit and mobile unit each comprising memory means for storing an identification code therein and means for transmitting information over a communication channel between the base unit and the mobile unit; the base unit and the mobile unit each remaining in a stand-by state in which information cannot be transmitted over such communication channel and being switched by the base station to an operational state in which information can be transmitted over such communication channel when a call request is received by the base unit from the external telephone network or from the mobile unit and the identification code in the mobile unit matches the identification code in the base unit; such method being characterized in that each time the mobile unit is replaced on base unit the identification code stored in each of such units is modified by the base unit by the steps of:

(a) switching the base unit and the mobile unit from the stand-by state to the operational state;

(b) comparing the existing identification code stored in the memory means in the mobile unit with the existing identification code stored in the memory means in the base unit, and when such codes match, proceeding immediately to step (c);

when such codes do not match, waiting a comparatively long time before proceeding to step (c);

(c) replacing the identification code stored in the memory means in the base unit and in the memory means in the mobile unit with a new identification code which is common to both such units; and (e) switching the base unit and the mobile unit back to the stand-by state.

2. A method in accordance with claim 1, wherein each of said replacing identification codes is formed by a microprocessor in the base unit in accordance with a pseudo-random algorithm to ensure that each such code is unique.

3. A method in accordance with claim 1, wherein in step (b):

when such codes do not match, entering a provisional new identification code in each of said memory means, which thereby is common to both such units, and thereafter waiting a comparatively long time before proceeding to said step (c).

4. A method in accordance with claim 1, wherein the comparatively long time specified in step (b) is about one hour.

5. A method in accordance with claim 1, wherein said communication channel is a radio channel and during transmission of telephone conversation over such radio channel the base unit periodically interrupts such transmission for comparatively short intervals during which the base unit determines whether the identification codes stored in the memory means in the base unit and in the memory means in the mobile unit match each other, such determination comprising at least the following steps:

(d) interrogating the memory means in the mobile unit to read-out the existing identification code stored therein;

(e) comparing the so-read out code with the existing identification code stored in the memory means in the base unit;

(f) when such compared codes match, re-establishing transmission over said radio channel; and (g) when such compared codes do not match, maintaining the interruption of said radio channel and returning the base station and the mobile station to the stand-by state.

6. A method in accordance with claim 5, wherein said comparatively short interval during which the base unit periodically interrupts said radio transmission channel is about 150 milliseconds.

* * * * *